United States Patent
Wilhelm et al.

(10) Patent No.: US 6,892,460 B2
(45) Date of Patent: May 17, 2005

(54) PLIERS-TYPE TOOL AND METHOD FOR CUTTING THROUGH OPTICAL FIBRE CABLES

(75) Inventors: Edgar Wilhelm, Altersbach (DE); Georg Holland-Moritz, Rotterode (DE); Bernd Tomas, Rotterode (DE)

(73) Assignee: Rennsteig Werkzeuge GmbH, Viernau/Thüringen (DE)

(*) Notice: Subject to any disclaimer, the term of this patent is extended or adjusted under 35 U.S.C. 154(b) by 14 days.

(21) Appl. No.: 10/416,955

(22) PCT Filed: Nov. 14, 2001

(86) PCT No.: PCT/DE01/04278
§ 371 (c)(1), (2), (4) Date: May 16, 2003

(87) PCT Pub. No.: WO02/41059
PCT Pub. Date: May 23, 2002

(65) Prior Publication Data
US 2004/0035004 A1 Feb. 26, 2004

(30) Foreign Application Priority Data
Nov. 16, 2000 (DE) .......................................... 100 56 780
Dec. 19, 2000 (DE) .......................................... 100 63 209

(51) Int. Cl.⁷ .............................. G02B 6/25; B26D 3/16
(52) U.S. Cl. .......................................... 30/134; 30/41.7
(58) Field of Search .......................... 30/134–135, 123, 30/41.7, 254, 233, 92

(56) References Cited

U.S. PATENT DOCUMENTS

| 4,445,632 A | 5/1984 | Margolin et al. |
| 4,643,520 A | 2/1987 | Margolin |
| 5,046,252 A | 9/1991 | Ayuta et al. |
| 5,901,449 A * | 5/1999 | Ulbrich et al. ................ 30/278 |

FOREIGN PATENT DOCUMENTS

| DE | 3406917 | 9/1985 |
| DE | 3436668 | 4/1986 |
| DE | 3509991 | 10/1986 |
| DE | 3802577 | 8/1989 |
| DE | 19842122 | 3/2002 |
| DE | 10056780 | 5/2002 |
| EP | 0829331 | 3/1998 |

* cited by examiner

Primary Examiner—Douglas D Watts
(74) Attorney, Agent, or Firm—Collard & Roe, P.C.

(57) ABSTRACT

The invention relates to a pliers-type tool and to a method for cutting through optical fibre cables (OF). According to the invention, the OF cable is received between the jaws of the pliers precisely, in a specific position, and is securely and precisely held and supported there. The invention uses a novel round blade (14) which is accommodated in a separately operated cutting device (23). A switching mechanism (26, 28, 31, 32) is allocated to the cutting device for measuring the duration of use of the cutting blade.

3 Claims, 2 Drawing Sheets

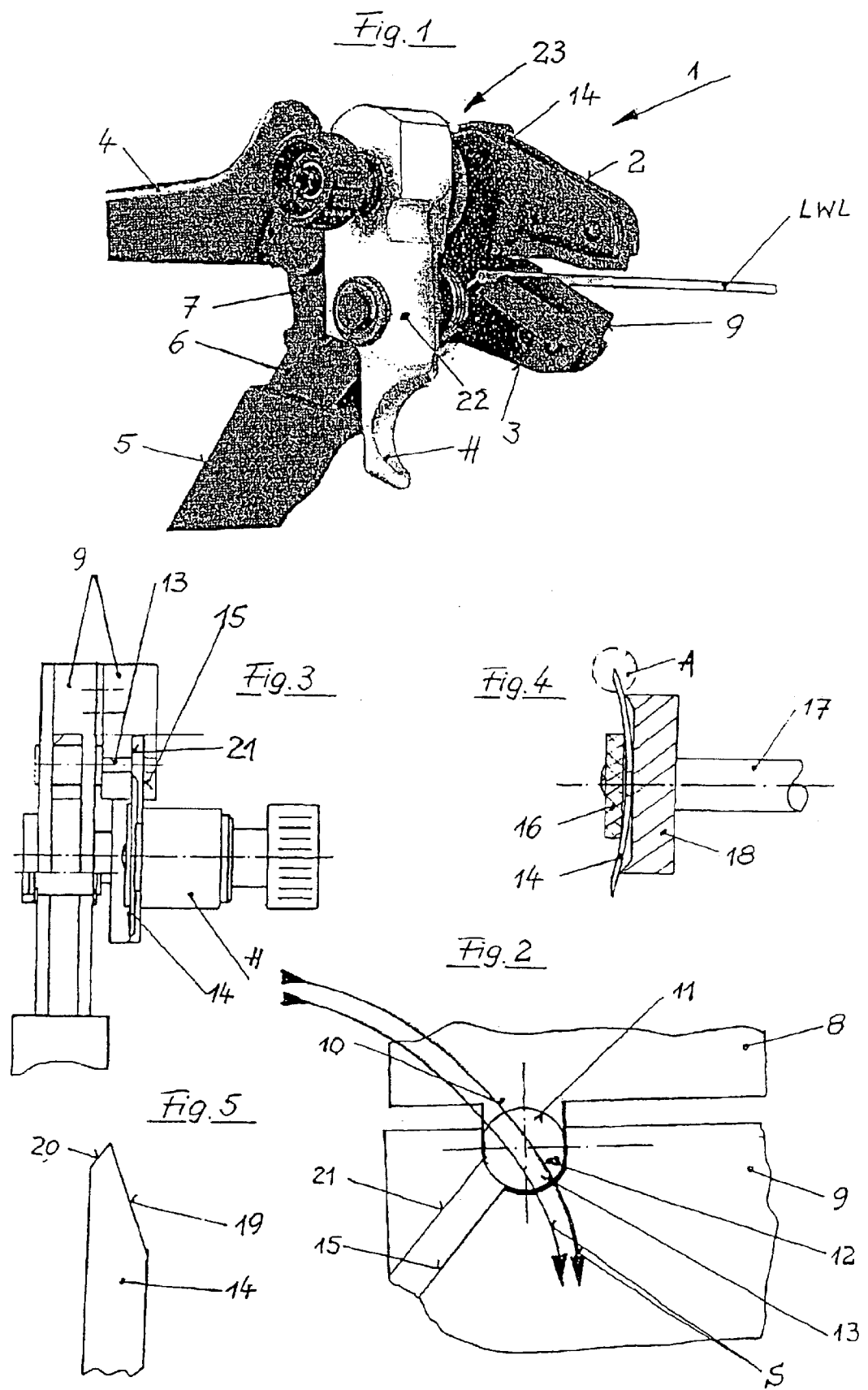

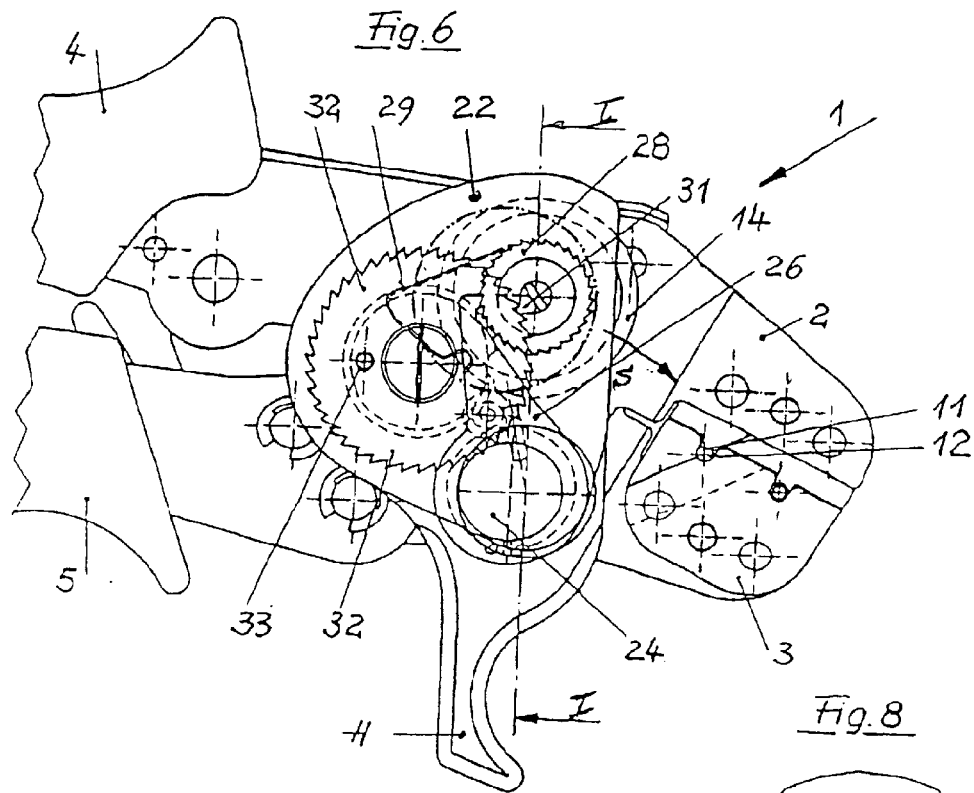
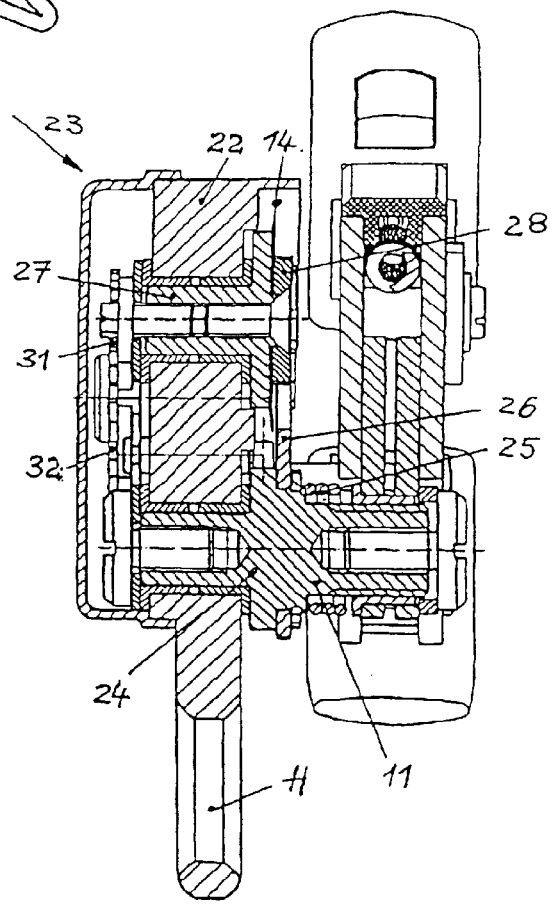

PLIERS-TYPE TOOL AND METHOD FOR CUTTING THROUGH OPTICAL FIBRE CABLES

BACKGROUND OF THE INVENTION

1. Field of the Invention

The invention relates to a pliers-type tool and a method for cutting through optical waveguide cables.

2. Prior Art

Pliers-type tools and methods for cutting through cables, including such for optical waveguides, are known (DE 3406917; DE 3436668; DE 3509991; DE 3802577).

These tools, predominantly in the form of manually operable pliers and designed for cutting through and, in some cases, also for stripping away cable insulations, no longer meet the requirements, in respect of the functional characteristics of the cutting devices used in them, that apply to the quality of the parting or cutting site on optical waveguide cables.

This is because, in the parting of optical waveguide cables, it is not sufficient to perform a simple parting cut, as is usual in the case of electric cables. Rather, in this case, it is a matter of executing the highest quality of parting cut in respect of the condition of the cut face on the optical waveguide fibre. The quality requirements in this case consist in realizing the cut face absolutely smoothly and perpendicularly relative to the longitudinal axis of the fibre and, at the same time, producing its surface with an optimum surface quality.

The cutting or parting device, previously proposed by the applicant in DE-OS 19842122, in a tool, to be handled in the manner of pliers, for performing various types of work on optical waveguide cables is also no longer capable of adequately fulfilling the current requirements in respect of the quality of the cut face in macrometric and micrometric scales.

SUMMARY OF THE INVENTION

Finally, for the purpose of further improving this cutting technology, a cutting device was proposed by the applicant (DE 10056780.0) in which, in different method steps, the locating of the optical waveguide cable, as well as its holding and clamping, determining its position, have been effected in a new manner and the cutting blade has been designed for executing more precise parting cuts.

This procedure proposed therein, together with the functional refinement of the cutting device, have opened up new possibilities in cutting technology for optical waveguide cables which have already been positively endorsed in practical application in the processing of optical waveguide cables.

Although, with these refinements, obvious improvements have been achieved, when it is a matter of ensuring or guaranteeing a constantly good quality of the parting or cut face on the optical waveguide cable, when such special tools are handled by technicians one factor remains outside the control required in this case.

Since the quality of cut is largely dependent on the condition and quality of the blade edge, it appears to be absolutely essential to take measures to ensure that a usable, sharp blade edge is always available to the user or fitter, in the constantly repeated use of the cutting device, without this requiring any active operation or action on the part of the user through adjustment of the cutting blade to a different, new cutting zone.

For other reasons, also, this hitherto subjective assessment should not continue to be left to the user or fitter. Rather, it should be characteristic of the pliers tool, taking effect automatically, in the form of a control mechanism integrated into the tool, which stops the latter after appropriate use.

This requirement for improved, objectively more effective control of the cutting characteristics of the cutting blade constitutes a further object of the present invention.

On the basis of the stated intended purposes, the object of the invention is to indicate a tool with a cutting device, as well as a method for parting optical waveguide cables, which is integrated, in a manner known in principle, into a manually operated pair of pliers, which can be brought into effect by a likewise known purchase device which can be operated independently of the closing movement of the pliers, and which, in a refining manner in respect of method, permits the achievement of a precise parting cut of a quality not hitherto achieved, running perpendicularly to the cable axis and producing a high surface quality at the cut face, and which, for the purpose of ensuring these quality standards, is furthermore to be provided with a forced-action control mechanism by means of which the duration of use of the edge can be predetermined, by limitation of the number of cuts of a cutting portion of the cutting blade, before the cutting device is completely and forcibly stopped.

To achieve this object, a tool is proposed which has the features characterized in the claims and, with the cutting device described more fully therein, on a manually operated pair of pliers, permits the execution of the proposed procedure. In a first set of solutions to the defined problem, the preconditions for a high-quality parting cut are fulfilled with the exact locating of the optical waveguide cable, defining its position, its holding, securing its position, and the novel, advantageous supporting of the optical waveguide cable between the bit jaws of the pliers, while, in a second set of solutions to the defined problem, the high operating quality of the cutting blade is assured, with a ratchet mechanism actuated independently of the operator during the cutting or parting operation, through the provision of a constantly new, unused cutting portion on the circumference of the cutting blade.

This ratchet mechanism belonging to the cutting device has the effect that, after a determined number of cutting strokes with the cutting device initiated by a purchase device, the cutting blade is rotated further, or indexed, by a partial step proportioned to the circumference in each case, in order to provide on the cutting blade circumference in each case a hitherto unused, new cutting portion. The advantages resulting from this are self-evident and obviously do not need to be described separately.

BRIEF DESCRIPTION OF THE DRAWINGS

The technical solution according to the invention, together with its solution elements, are characterized more fully in the claims and in the embodiment example with reference to the associated drawing, wherein:

FIG. 1 shows the cutting and crimping tool, to be handled in the manner of pliers, with a cutting device in perspective side view;

FIG. 2 shows the side view of a detail, representing the pair of clamping jaws with the cable clamping device for the novel, advantageous method steps;

FIG. 3 shows the top view on to the lower clamping jaw with the cutting device in the operated position;

FIG. 4 shows the side view of the locator and clamping holder of the cutting blade;

FIG. 5 shows the cross-section of the cutting-blade edge, in greatly enlarged scale, corresponding to the detail "A" in FIG. 4;

FIG. 6 shows the head part of a pair of optical waveguide cutting and crimping pliers with an integrated ratchet mechanism for the cutting blade;

FIG. 7 shows a detail from FIG. 6, representing the pawl and latching tooth;

FIG. 8 shows, in section along the line I—I in FIG. 6, the front view of the pair of cutting and crimping pliers with the cutting blade and the ratchet mechanism.

DETAILED DESCRIPTION OF THE INVENTION

The design of the cutting device on a pair of manually operable pliers 1, by means of which various work can be performed on optical waveguide cables, such as removal of insulation, parting and crimping, provides for a special cutting technology by which the cable end can be parted in an exact manner, i.e., perpendicularly to the longitudinal axis of the fibre and with a good surface quality of the cut face.

This pair of pliers 1 is of a design which is known in principle. It consists of a fixed bit jaw 2, a movable bit jaw 3 and of handles 4 and 5, and can be brought into an open or closed position through a conventionally functioning and designed toggle lever mechanism 6 and 7.

Attached to the bit jaws 2 and 3 in a fixed, but replaceable, manner are specially designed clamping jaws 8 and 9, which each carry a clamping profile appropriate to the size of the optical waveguide cable, as shown by FIG. 2.

The strip-type clamping profile 10 mounted on the upper, relatively fixed clamping jaw 8 has a concave clamping face 11 running transversely relative to the bit of the pliers. The clamping profile 12 mounted on the lower, relatively movable clamping jaw 9 is in the form of a groove 13 and, together with the clamping face 11, forms a round circular cross-section in which the optical waveguide cable is located with a full form-fit.

The form-fit represented in FIG. 2 is precisely matched to the diameter of the optical waveguide cable so that, when the pliers are closed, the cable is located without any play in the longitudinal and transverse directions. In addition, upon closing of the bit or clamping jaws 8 and 9, it is tensioned in its location in such a way that, under the effect of the cutting pressure by the cutting blade 14, it cannot change the spatial position apportioned to it.

A further particularity of the cutting technology according to the invention also consists in that, with the aforementioned clamping position, the clamping profile 12 disposed on the clamping jaw 9 is laterally cleared towards the cut-off end of the optical waveguide cable, i.e., away from the cutting blade 14, as has been indicated by the clearance 15 in FIG. 2. In this outer region, therefore, the optical waveguide cable is not fully enclosed by the clamping profiles 11; 12, but only supported on the lower portion of the clamping profile 12, as indicated by a bold line in FIG. 2. It is therefore able to yield to the appropriate extent to the laterally acting cutting pressure by the cutting blade 14, actuated by swivelling-in of the purchase device "H", but without being able to change its spatial position. Moreover, for a smooth cutting operation, the outer portion of the clamping profile 12, or the groove 13, is inclined slightly outwards, i.e., towards the free end of the optical waveguide cable, as has been shown to be advantageous in the cutting operation, depending on the type and size of cable.

Further features of the cutting technology according to the invention also consist in the design of the cutting blade 14 which, for the cutting or parting operation to be performed on optical waveguide cables, enables novel and advantageous effects to be achieved in respect of the quality of the parting face on the functional part of the cable.

Firstly, the locating and holding device for the cutting blade 14 provides for an axial bracing provided in the plane of the blade, as indicated in a greatly enlarged representation in FIG. 4. This bracing, by means of a strain washer 16, provides the cutting blade 14 with an inner stability in the cutting plane which is greater than in the normal state, so as to prevent the blade from bending away.

In addition, the axial bracing of the cutting blade 14 on the shaft 17 against the bearing flange 18, together with the edge bevel 19, produces advantageous effects in that, during the execution of the parting cut on the firmly clamped optical waveguide cable, an axially inwardly directed pressure component becomes effective on the so-called cable core. This results in an effect which has a polishing action and which smoothes the surface of the cable core in a desirable manner. In order to increase this effect further, the edge bevel 19 is provided with a cutting lip 20, executed in the micro range, the effect of which is to smooth the cut face of the core of the optical waveguide cable by pressure polishing, in order to prevent any scattering losses of the light energy to be transmitted at the contract face smoothed in this way. Moreover, the cutting lip 20 can be slightly curved, a factor which has proved to have further advantage.

The procedure and handling of the cutting device for parting optical waveguide cables with a pair of pliers of the indicated design is as follows:

Starting from the task of placing a new contact on an optical waveguide in a technically correct manner and of executing a parting cut for this purpose, following the opening of the two bit jaws 2; 3, the cable end, as shown in FIG. 2, is inserted in the clamping jaws 8; 9, where it is precisely inserted in the clamping profile 12, in order then to be pressed, by the closing movement of the handles 4; 5 of the pliers, against the similarly shaped clamping profile 11 of the clamping profile 10 belonging to the fixed bit jaw 2, or clamping jaw 8. This produces an immovably fixed seating of the cable, this seating being fixed in the end position by means of the lever mechanism which is usual for such pliers.

The optical waveguide cable is then cut, or parted, using the cutting device which is to be operated when the pliers are closed, for which purpose the purchase device H, in the form of a swivel arm, is swivelled in the known manner by the finger of the operating hand in the cutting direction "S".

In the course of this swivelling movement, the cutting blade 14 first comes laterally to the cut edge 21 of the clamping jaw 9, where it is supported with a controllable initial tension so as to allow no play whatsoever at the cut edge 21 during cutting. Since the cutting blade 14 is in any case pretensioned in the axial direction, see FIG. 4, as the cutting movement progresses further, a parting of the cable is achieved which is fully free from play and with the surface effects mentioned above.

Following completion of the cutting or parting operation, the swivel arm, with the cutting blade 14, returns automatically to its initial position under spring tension. The pliers can then be opened in the usual manner and the optical waveguide cable removed from the clamping profiles.

In a further refinement of this type of pliers, a ratchet mechanism has been assigned the integrated cutting device for the optical waveguide cable. This ratchet mechanism is designed to count or register the number of parting cuts to be executed with one edge portion of the circular cutting blade 14 and to ensure, with the control mechanism thereby created, that only a predefined number of parting cuts can be executed with one edge portion on the cutting blade 14 before a new, unused edge portion is made available through the rotating indexing of the cutting blade 14.

The structure and functioning of the ratchet mechanism on the cutting device are as follows:

Disposed in the region of the head part of the pliers, is the cutting device 23, together with the cutting blade 14, which is equipped with the purchase device "H" including the swivel arm 22 and is pivotally mounted on a pin 24 for the purpose of being swivelled in, by means of the purchase device "H" with the swivel arm 22, towards the bit jaws 2 and 3 between which the optical waveguide cable to be cut is located and partially clamped, for the purpose of executing the cutting or parting operation in the arrow direction "S".

The swivel arm 22, which is mounted in the head part of the pliers with the pin 24, is initially held out of cutting engagement by a spring 25, as shown in FIG. 1 and FIG. 6.

At the same time, there is disposed on this swivel arm 22 the ratchet mechanism assigned, according to the invention, to the cutting device 23, for the intermittent further rotation or indexing of the cutting blade 14, which ratchet mechanism serves the purpose, as explained, of replacing the portion of the blade edge hitherto in use by an unused, new edge portion after a certain number of parting cuts.

This ratchet mechanism is formed, firstly, from a pawl 26 located eccentrically on the pin 24 (FIGS. 6 and 8) and from a ratchet wheel 28, attached to the bearing pin 27 of the cutting blade 14 and joined to it in a rotationally positive manner.

The pawl 26, acted upon by a retaining spring 29, is in constant active contact with the said ratchet wheel so that, upon actuation of the swivel arm 22 for the purpose of executing the cutting and parting operation, the ratchet wheel 28 is indexed at the same time by one tooth division by means of the eccentrically moved pawl 26.

Depending on the number of teeth on the ratchet wheel 28, in the embodiment example preferably 30 teeth, 30 indexing steps and then, consequently, 30 indexings are performed on the ratchet wheel 28 by the pawl 26 before a tooth division is indexed on the indexing wheel 32 by the cam 31. The ratchet mechanism in this case provides for a further mechanism before the intended stoppage of the cutting device is effected.

Following each full rotation of the ratchet wheel 28, the cam 31 engages with the indexing wheel 32, as shown, as a result of which the indexing wheel 32 is indexed by one tooth division. This means that, in the case of an assumed tooth number of, for example, 42 teeth, the ratchet mechanism allows 30×42=1260 change operations before it is stopped by an appropriately provided index pin 33, which is not accessible from the outside, and the cutting device is fully blocked in a deliberate manner.

The cutting capacity of the cutting blade 14 is to be rated, or limited, according to these 1260 change operations which are possible with the ratchet mechanism and which thus correspond to the number of parting cuts that can be executed with this cutting device. The cutting device should then be opened, and the cutting blade changed, only by an authorized workshop.

The created limitation and control over the duration of use of a cutting blade to be observed according to the invention assures, to a large degree, the required constantly good surface quality on the cut or parting face of the optical waveguide cable and, consequently, the effective energy transmission sought by means of the latter.

LIST OF REFERENCES

1 Pliers, head part of pliers
2 Fixed bit jaw
3 Movable bit jaw
4 }Handles
5
6 }Toggle lever
7
8 }Clamping jaw
9
10 Clamping profile as clamping forcer
11 Clamping face
12 Clamping profile
13 Groove on clamping jaw 9
14 Cutting blade
15 Clearance
16 Strain washer
17 Blade locating shaft
18 Bearing flange
19 Edge bevel
20 Cutting lip
21 Cut edge on clamping jaw 9
22 Swivel arm
23 Cutting device
24 Pin
25 Spring
26 Pawl
27 Bearing pin
28 Ratchet wheel
29 Retaining spring
30
31 Cam
32 Indexing wheel
33 Index pin
"A" Detail in FIG. 6
"H" Purchase device
"S" Cutting direction by cutting blade 14

What is claimed is:

1. A pliers-type tool for producing a precise parting cut in a length of fiber optic cable, the pliers-type tool comprising:
   a) a manually operable pair of pliers comprising:
      i) a pair of handles;
      ii) a fixed bit jaw;
      iii) a movable bit jaw; and
      iv) a toggle lever mechanism coupled to said pair of handles for displacing said movable bit jaw relative to said fixed bit jaw;
   b) a clamping device for securely holding a portion of the length of fiber optic cable in the pliers-type tool, said clamping device comprising:
      i) an upper clamping jaw coupled to said fixed bit jaw;
      ii) a concave clamping face disposed on a surface of said upper clamping jaw facing said portion of the length of fiber optic cable;
      iii) a lower clamping jaw coupled to said movable bit jaw and having a clearance disposed in an outer region of said lower clamping jaw and extending away from said portion of the length of fiber optic cable;
      iv) a concave groove disposed on a surface of said lower clamping jaw, facing said portion of the length of fiber optic cable, wherein said portion of the length of fiber optic cable is securely positioned between said concave clamping face and said concave groove when said pair of pliers is in a closed position, and wherein said portion of the length of fiber optic cable is supported by said concave groove arid able to yield into said clearance during a cutting operation; and c) a cutting device comprising:
   i) a pin;
   ii) a swivel arm pivotally mounted to said movable bit jaw on said pin, wherein said swivel arm can be actuated independently of a displacement of said movable bit jaw relative to said fixed bit jaw;
   iii) a bearing pin;
   iv) a round cutting blade having a beveled edge mounted to said swivel arm on said bearing pin; and
   v) a ratchet mechanism comprising:
      (1) a rachet wheel rotationally fixed to said bearing pin of said cutting blade;
      (2) a pawl eccentrically mounted to said pin of said swivel arm and engaging said rachet wheel such that for each actuation of said swivel arm, said rachet wheel is indexed by one division and said round cutting blade is rotationally advanced by a corresponding amount;
      (3) an indexing wheel;
      (4) a cam rotationally fixed to said bearing pin of said cutting blade and engaging said indexing wheel such that for each full rotation of said rachet wheel, said indexing wheel is indexed by one division; and
      (5) an index pin fixed on said indexing wheel for preventing further actuation of said swivel arm once said indexing wheel has been advanced for a predetermined number of divisions.

2. The pliers-type tool of claim 1, further comprising a locating and holding device for increasing a lateral stability of said round cutting blade, said locating and holding device comprising:
   a) a blade locating shaft;
   b) a bearing flange disposed on said blade locating shaft; and
   c) a strain washer disposed on said blade locating shaft, wherein said round cutting blade is disposed on said blade locating shaft between said bearing flange and said strain washer which provide an axial tension on said round cutting blade and wherein said round cutting blade is slidably guided and supported by an edge of said lower clamping jaw when said swivel arm is actuated during a cutting operation;

wherein said round cutting blade includes an edge comprising an asymmetrical wedge formed by a bevel on one side and a convexly curved cutting lip having a superfine finish on an opposite side.

3. A method for producing a precise parting cut in a length of fiber optic cable using the pliers-type tool according to claim 1, the method comprising the steps of:
   a) locating a stripped end portion of the length of fiber optic cable between said upper clamping jaw secured to said fixed bit jaw and said lower clamping jaw fixed to said movable bit jaw wherein said upper and lower clamping jaw provide a cross section corresponding to a diameter of the stripped end portion of the length of fiber optic cable;
   b) displacing said movable bit jaw relative to said fixed bit jaw to fully enclose the stripped end portion of the length of fiber optic cable in a form-fitting manner, where the stripped end portion of the length of fiber optic cable is longitudinally locked in position and clamped transversely with respect to a longitudinal axis of the length of fiber optic cable and wherein an end portion of the stripped end portion of the length of fiber optic cable which is to be cut through is only loosely supported without being securely clamped;
   c) cutting through the end portion of the stripped end portion of the length of fiber optic cable with said round cutting blade by swivelling said swivel, arm holding said round cutting blade toward the clamped stripped end portion of the length of fiber optic cable; and
   d) counting each cut with said rachet mechanism to regulate a number of cuts made by said round cutting blade.

* * * * *